(12) United States Patent
Shiomi et al.

(10) Patent No.: US 8,176,904 B2
(45) Date of Patent: May 15, 2012

(54) INTAKE SYSTEM FOR AN INTERNAL COMBUSTION ENGINE

(75) Inventors: Daisuke Shiomi, Wako (JP); Yukio Miyashita, Wako (JP); Takaaki Fukusako, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 126 days.

(21) Appl. No.: 12/749,572

(22) Filed: Mar. 30, 2010

(65) Prior Publication Data

US 2010/0242877 A1 Sep. 30, 2010

(30) Foreign Application Priority Data

Mar. 31, 2009 (JP) ................................. 2009-087091

(51) Int. Cl.
*F02B 23/00* (2006.01)
(52) U.S. Cl. ..................... 123/585; 123/179.18; 123/336
(58) Field of Classification Search .......... 123/585–590, 123/478, 486, 556, 336, 179.16, 179.18, 123/442
See application file for complete search history.

(56) References Cited

U.S. PATENT DOCUMENTS

| | | | |
|---|---|---|---|
| 4,445,480 A | 5/1984 | Inoue et al. | |
| 4,488,531 A | 12/1984 | Tadokoro et al. | |
| 4,612,903 A | 9/1986 | Urabe et al. | |
| 4,614,174 A | 9/1986 | Tanigawa et al. | |
| 4,796,584 A * | 1/1989 | Goto et al. | 123/403 |
| 5,158,060 A * | 10/1992 | Hara | 123/494 |
| 5,533,483 A | 7/1996 | Gau et al. | |
| 5,813,386 A * | 9/1998 | Okada et al. | 123/339.14 |
| 6,648,706 B2 * | 11/2003 | Kanno | 440/84 |
| 7,757,660 B2 * | 7/2010 | Komiyama et al. | 123/337 |

(Continued)

FOREIGN PATENT DOCUMENTS

GB 2 311 561 A 10/1997

(Continued)

OTHER PUBLICATIONS

Japanese Office Action application No. 2009-087091 dated Mar. 4, 2011.

(Continued)

*Primary Examiner* — John Kwon
(74) *Attorney, Agent, or Firm* — Squire Sanders (US) LLP (57) ABSTRACT

In an intake system comprising a first intake passage (1) having an upstream end communicating with an intake duct (3) and a downstream end communicating with an intake port of an engine cylinder, a first intake control valve (6) provided in the first intake passage, a second intake passage (2) having an upstream end communicating with the intake duct and a downstream end communicating with the intake port of the engine cylinder, a second intake control valve (7) provided in the second intake passage, an accelerator pedal(ACL) and a control unit (100) for controlling opening angles of the first and second intake control valves, the second intake control valve is opened when the first intake control valve has opened to an effective opening angle and an intake air flow rate is required to be further increased. The effective opening angle may be defined in a region where a change in the intake air flow rate of the first intake passage for a given change in the opening angle of the first intake control valve falls below a prescribed level. Thereby, as the accelerator pedal is depressed, a continuous increase in the intake air flow rate without involving a saturated region can be achieved.

14 Claims, 10 Drawing Sheets

U.S. PATENT DOCUMENTS

2009/0000389 A1 1/2009 Redon

FOREIGN PATENT DOCUMENTS

| | | |
|---|---|---|
| JP | 61-79833 A | 4/1986 |
| JP | 63-201336 | 8/1988 |
| JP | 5-17402 | 3/1993 |
| JP | 7217475 A | 8/1995 |

OTHER PUBLICATIONS

European Search Report application No. 10158609.7 dated Mar. 4, 2011.

* cited by examiner

INTAKE SYSTEM FOR AN INTERNAL COMBUSTION ENGINE

TECHNICAL FIELD

The present invention relates to an intake system for an internal combustion engine.

BACKGROUND OF THE INVENTION

Conventionally, it has been practiced to conduct intake air into each cylinder via two separate passages, and to provide a first intake control valve in the first passage and a second intake control value in the second passage. In particular, the timing of opening one of the two intake control valves may be shifted to that of the other so that the performance of the engine may be optimized over the entire rotational speed range. See Japanese patent laid open publication No. 63-201336 (patent document 1). In the previously proposed system, the two intake control valves are opened one after the other as the rotational speed of the engine is increased.

When two intake control valves are used, it is important to be able to accurately determine the intake air flow rate of each intake control valve so that a desired optimum engine control may be performed. In Japanese UM publication No. 5-17402 (patent document 2), it is disclosed to detect an opening angle of the intake control valve, consisting of a butterfly valve, for instance, and estimate the intake air flow rate from the detected opening angle of the intake control valve.

The changes in the intake pressure immediately downstream of an intake control valve (or the intake volume for each cylinder or torque output) for a given change in the opening angle of the intake control valve increases when the engine rotational speed is reduced, and decreases when the engine rotational speed is increased. As the first intake control valve is gradually opened from a small opening angle, the increase rate of the intake pressure drops and the intake pressure converges to a certain value (or reaches a saturated state) once a critical pressure is reached. The converged value is lower as the engine rotational speed is increased. The opening angle of the first intake control valve corresponding to the converged value (effective opening angle) is greater as the engine rotational speed is increased.

Conventionally, the second intake control valve is opened when the opening angle of the first intake control valve has reached a prescribed opening angle (such as a full open angle) in a sequential manner. Therefore, the second intake control valve may not be opened although the opening angle of the first intake control valve has reached a converged value at which the increase rate of the intake pressure is minimal or the intake pressure has saturated. In this region, the vehicle operator feels that the engine torque does not to respond to the depression of the accelerator pedal. In other words, the vehicle operator feels that the vehicle does not accelerate even though the vehicle operator steps on the accelerator pedal, and this may impair the handling or the impression of the vehicle. This occurs not only when accelerating the vehicle but also when decelerating the vehicle.

BRIEF SUMMARY OF THE INVENTION

In view of such problems of the prior art, a primary object of the present invention is to provide an engine intake system for an internal combustion engine having a first intake control valve and a second intake control valve which ensures a smooth acceleration of the vehicle by eliminating a non-responsive region in the depression stroke of an accelerator pedal.

To achieve such an object, the present invention provides an intake system for an internal combustion engine, comprising a first intake passage having an upstream end communicating with an intake duct and a downstream end communicating with an intake port of an engine cylinder, a first intake control valve provided in the first intake passage, a second intake passage having an upstream end communicating with the intake duct and a downstream end communicating with the intake port of the engine cylinder, a second intake control valve provided in the second intake passage and a control unit for controlling opening angles of the first and second intake control valves, wherein: the control unit is configured to start opening the second intake control valve when the first intake control valve has opened to an effective opening angle which depends on a rotational speed of the engine.

According to another aspect of the present invention, the intake system is controlled by a method comprising the steps of opening the first intake control valve in dependence on a depression stroke of the accelerator pedal, and opening the second intake control valve when the first intake control valve has opened to an effective opening angle which depends on a rotational speed of the engine.

Thereby, as soon as the opening angle of the first intake control valve reaches the effective opening angle beyond which the increase in the intake air flow rate significantly diminishes and the intake air flow rate required by the depression of the accelerator pedal is not obtained, the second intake control valve starts opening. Therefore, the engine is avoided from experiencing a saturation in the intake air flow rate due to the limitations of the first intake control valve near its fully open state can be avoided. Therefore, the engine is allowed to accelerate in a continuous manner as the accelerator pedal is depressed without involving any non-responsive region.

According to a specific aspect of the present invention, the effective opening angle is defined in a region where a change in the intake air flow rate of the first intake passage for a given change in the opening angle of the first intake control valve falls below a prescribed level. According to a more specific aspect of the present invention, the effective opening angle increases as the rotational speed of the engine increases.

Preferably, the first intake control valve is maintained at the effective opening angle during a time the second intake control valve is opened, the effective opening angle changing in dependence on the rotational speed of the engine.

When the accelerator pedal is released from a depressed state, the first intake control valve may start to be closed from the effective opening angle when the second intake control valve has been fully closed from an open state.

Typically, the engine comprises a plurality of cylinders, and the first intake control valve is provided common to the cylinders while the second intake control valve is provided for each cylinder.

For precise control of the intake flow rate over the entire depression stroke of the engine and over a wide rotational speed range, the control unit may be configured to compute a target intake air flow rate, to compute an effective opening angle of the first intake control valve according to the rotational speed of the engine, to compute an effective intake air flow rate when the first intake control valve is at the effective opening angle and the second intake control valve is substantially fully closed, to determine if the target intake air flow rate is greater than the effective intake air flow rate, to determine if the opening angle of the first intake control valve is greater than a first threshold opening angle which may be equal to the effective intake air flow rate or slightly smaller than the same, to issue a permission to allow the second intake control valve to be opened if the target intake air flow rate is greater than the effective intake air flow rate, and the opening angle of the first intake control valve is greater than the first threshold opening angle, and to maintain the permission until the target intake air flow rate becomes smaller than the effective intake air flow rate, and the opening angle of the first intake control valve is smaller than a first threshold opening angle which is slightly smaller than the first threshold opening angle, and cancel the permission thereafter.

BRIEF DESCRIPTION OF THE DRAWINGS

Now the present invention is described in the following with reference to the appended drawings, in which.

DETAILED DESCRIPTION OF THE PREFERRED EMBODIMENT(S)

Now the present invention is described in the following in more detail in terms of a concrete embodiment with reference to the appended drawings.

Figure 1:
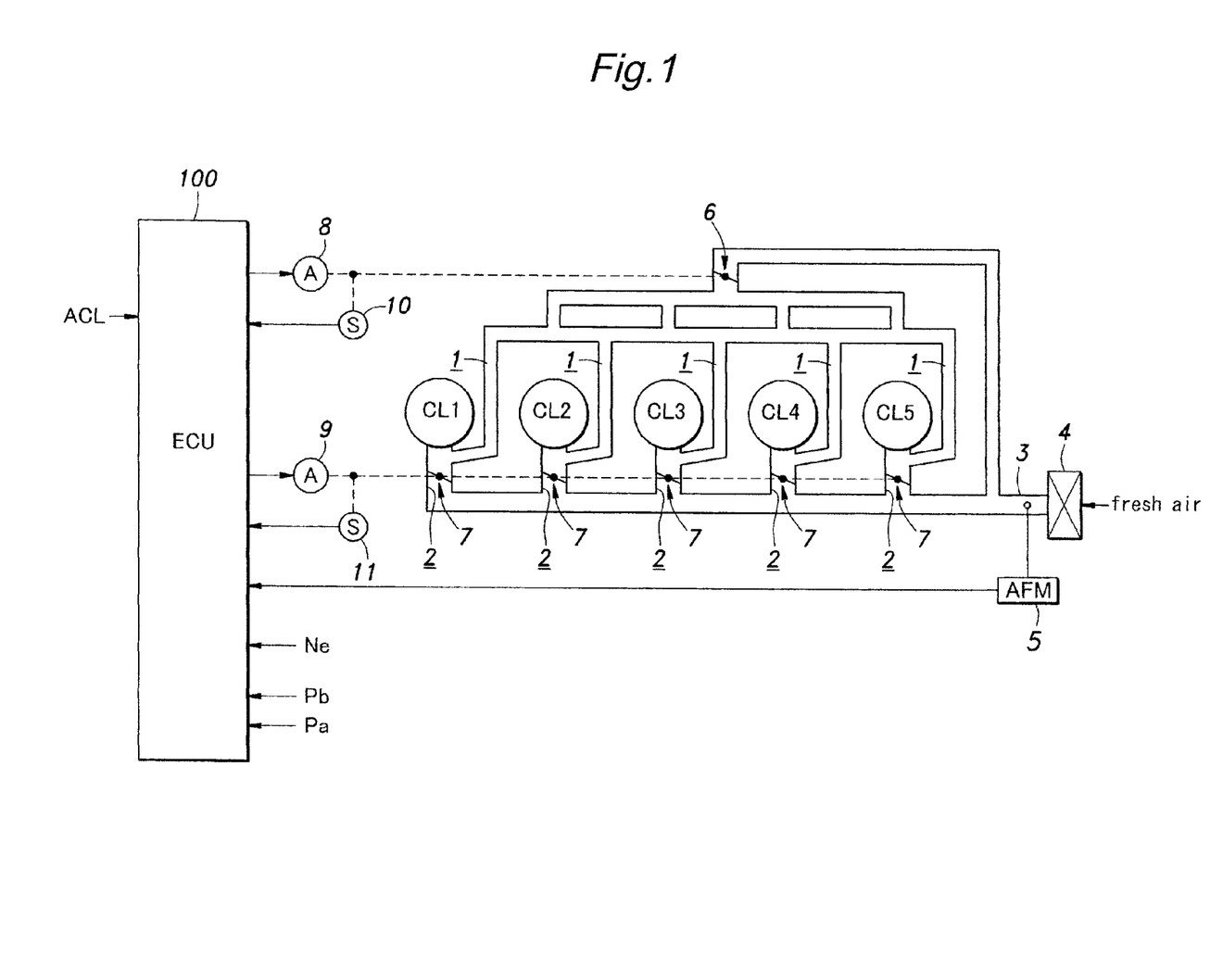
FIG. 1 is a schematic diagram illustrating an essential part of an intake system for an internal combustion engine embodying the present invention.

FIG. 1 shows an intake system for an internal combustion engine embodying the present invention. An intake portion for each cylinder CL1-CL5 communicates with a first intake passage 1 and a second intake passage 2. These two passages 1 and 2 communicate with an intake duct 3 at upstream ends thereof. An air filter 4 is provided in an upstream end of the intake duct 3. The intake duct 3 is provided with an air flow meter 5 for measuring a flow rate of intake flow into the intake duct 3 at a point upstream of a point at which the intake duct 3 diverges into the first and second intake passages 1 and 2.

An upstream part of the first intake passage 1 consists of a common single passage branched off from the intake duct 3, and is provided with a first intake control valve 6 which may consist of a butterfly valve. In other words, the single first intake control valve 6 is commonly provided for the five cylinders.

Downstream of the first intake control valve 6, the first intake passage 1 branch out in two stages in a tournament pattern, and there is a common passage extending across the branched passages at each stage. The final branched passages of the first intake passage 1 are individually connected the intake ports of the corresponding cylinders CL1-CL5.

The second intake passages 2 branch out directly from the intake duct 1 so as to correspond to the different cylinders CL1-CL5, and each second intake passage 2 is provided with an individual second intake control valve 7 consisting of a butterfly valve.

In the illustrated embodiment, the intake control valves 6 and 7 are under a drive-by-wire control. The first intake control valve 6 is actuated by a corresponding first actuator 8, and the second control valves 7 are jointly actuated by a second actuator 9 via a synchronizing mechanism. A first opening angle sensor 10 is interposed between the first intake control valve 6 and actuator 8, and a second opening angle sensor 11 is interposed between the second intake control valves 7 and actuator 9.

The actuators 8 and 9 for the intake control valves 6 and 7 are controlled by an electric control unit (ECU) 100 which receives opening angle detection signals from the opening angle sensors 10 and 11 and an upstream air flow detection signal from the air flow meter 5. The ECU 100 also receives an accelerator pedal signal ACL from an accelerator pedal (not shown in the drawings), a rotational speed signal Ne from an engine rotational speed sensor (not shown in the drawings), an intake pressure Pb from an intake pressure sensor (not shown in the drawings) and an atmospheric pressure sensor Pa from an atmospheric pressure sensor (not shown in the drawings). Based on these sensor signals, the ECU 100 controls the intake control valves 6 and 7.

Figure 2:
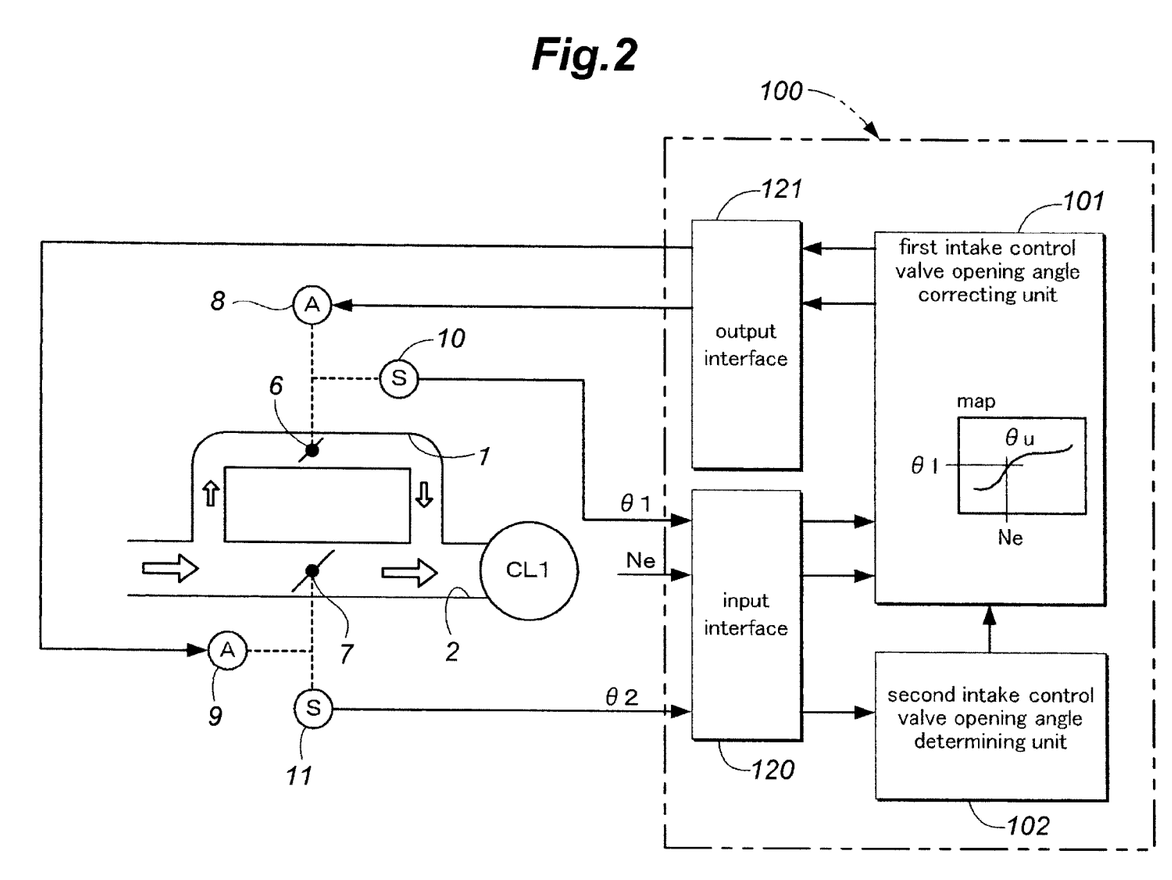
FIG. 2 is a simplified block diagram of the intake system.

FIG. 2 shows an essential structure of the intake system embodying the present invention. In FIG. 2, only one cylinder CL1 is illustrated, and the corresponding written description is directed only to the one cylinder CL1 as the same illustration and written description equally apply to the remaining cylinders.

The ECU 100 essentially consists of a microcomputer including a processor (CPU) for executing arithmetic operations, random access memory (RAM) providing a storage area for temporarily storing data and a work area for the arithmetic operations executed by the CPU, read-only-memory (ROM) for storing a computer program to be run by the CPU and data required for the arithmetic operations and rewritable non-volatile memory for storing the results of the arithmetic operations performed by the CPU and storing some of the data obtained from various parts of the engine. The non-volatile memory may also consist of RAM equipped with a back up circuit that provides electric power to the memory even after the system has been shut down.

The intake control functional elements of the ECU 100 include an input interface 120 for receiving the rpm signal (Ne), the opening angle signal θ1 of the first intake control valve 6 detected by the first opening angle sensor 10, the opening angle signal θ2 of the second intake control valves 7 detected by the second opening angle sensor 11, a first intake control valve opening angle correcting unit 101, a second intake control valve opening angle determining unit 102, and an output interface 121 for forwarding control signals to the first actuator 8 for the first intake control valve 6 and the second actuator 9 for the second intake control valves 7. The ECU 100 is programmed so as to perform the functions of the first intake control valve opening angle correcting unit 101 and the second intake control valve opening angle determining unit 102.

The input interface 120 interfaces the ECU 100 with various parts of the engine system, and is configured to process information indicating the operating condition of the vehicle forwarded from various parts of the engine system. The information is retrieved as analog signals which are then converted into corresponding digital signals. The obtained digital signals are forwarded to the first intake control valve opening angle correcting unit 101, a second intake control valve opening angle determining unit 102, and other control units (not shown in the drawings) for various parts of the engine. The signals shown in FIGS. 1 and 2 are only exemplary, and other signals may also be processed by the illustrated control unit.

The first intake control valve opening angle correcting unit 101 receives the rpm signal Ne, and by looking up a map stored in the memory of the ECU 100, computes an effective opening angle θu corresponding to the detected rpm signal Ne. The first intake control valve opening angle correcting unit 101 further receives an opening angle signal θ1 of the first intake control valve 6, and forwards a control signal to the actuator 8 so as to make the detected opening angle θ1 agree with the computed effective opening angle θu. When the opening angle θ1 has become equal to the computed effective opening angle θu, the first intake control valve opening angle correcting unit 101 forwards a control signal to the actuator 9 to command the actuator 9 to start opening the second intake control valve 7.

The second intake control valve opening angle determining unit 102 receives an opening angle signal θ2 of the second intake control valve 7, and determines how far the second intake control valve 7 is open. The determination result is forwarded to the first intake control valve opening angle correcting unit 101. The first intake control valve opening angle correcting unit 101 adjusts the control signal for opening the first intake control valve 6 depending on the opening state of the second intake control valve 7. This process is described hereinafter in greater detail.

The output interface 121 has the function to forward control commands computed by the ECU 100 to the intake system. However, this is only exemplary, and the output interface 121 may also forward control signals to other onboard systems and controllers.

Figure 3:
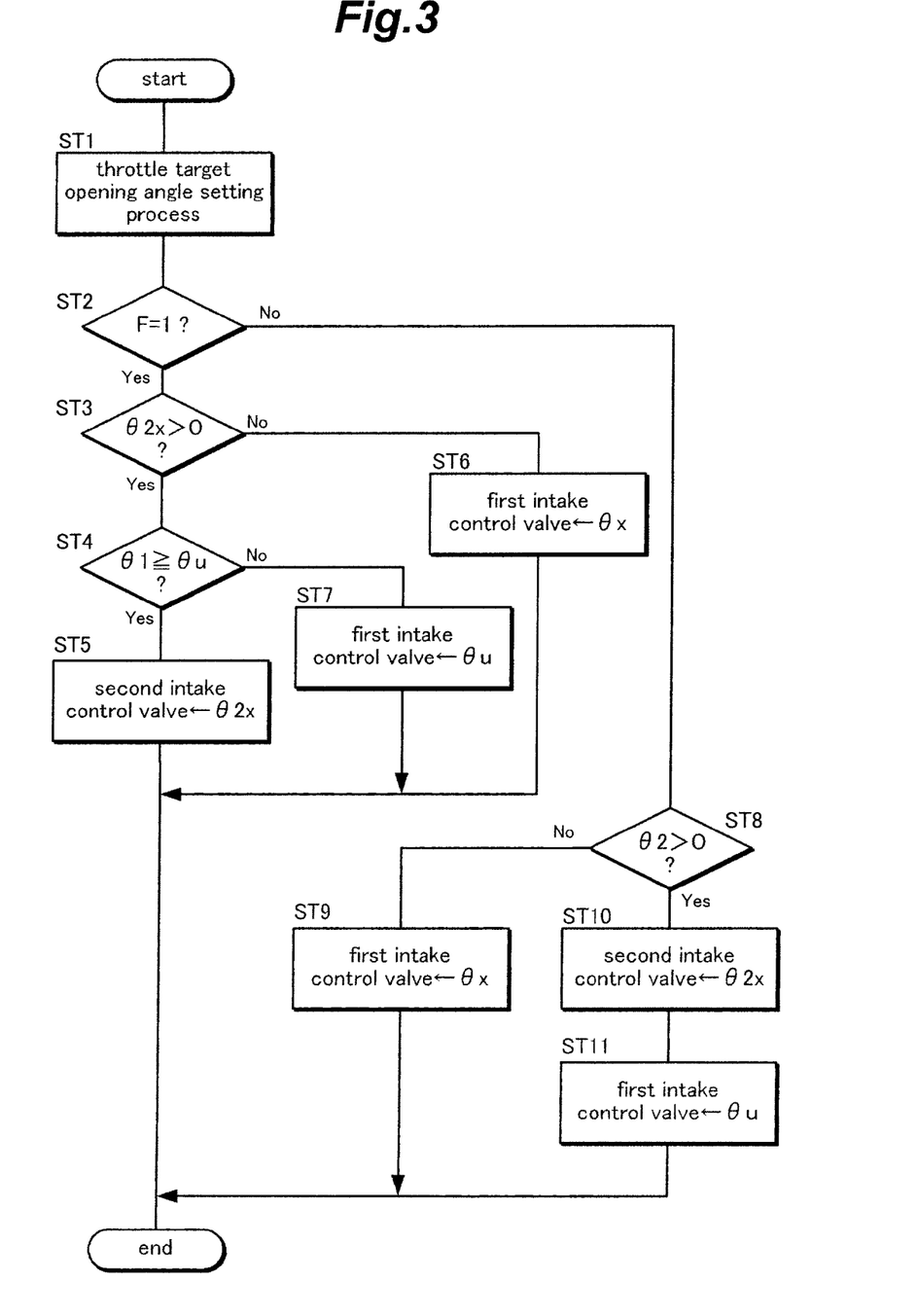
FIG. 3 is a flowchart showing a control flow of the control process for a first intake control valve and a second intake control valve of the first embodiment.

The control process of the intake system is described in the following with reference to FIGS. 3 and 4. Referring to FIG. 3, first of all, a throttle target opening angle setting process is carried out in step ST1. The throttle target opening angle setting process is described with reference to FIG. 4.

Figure 4:
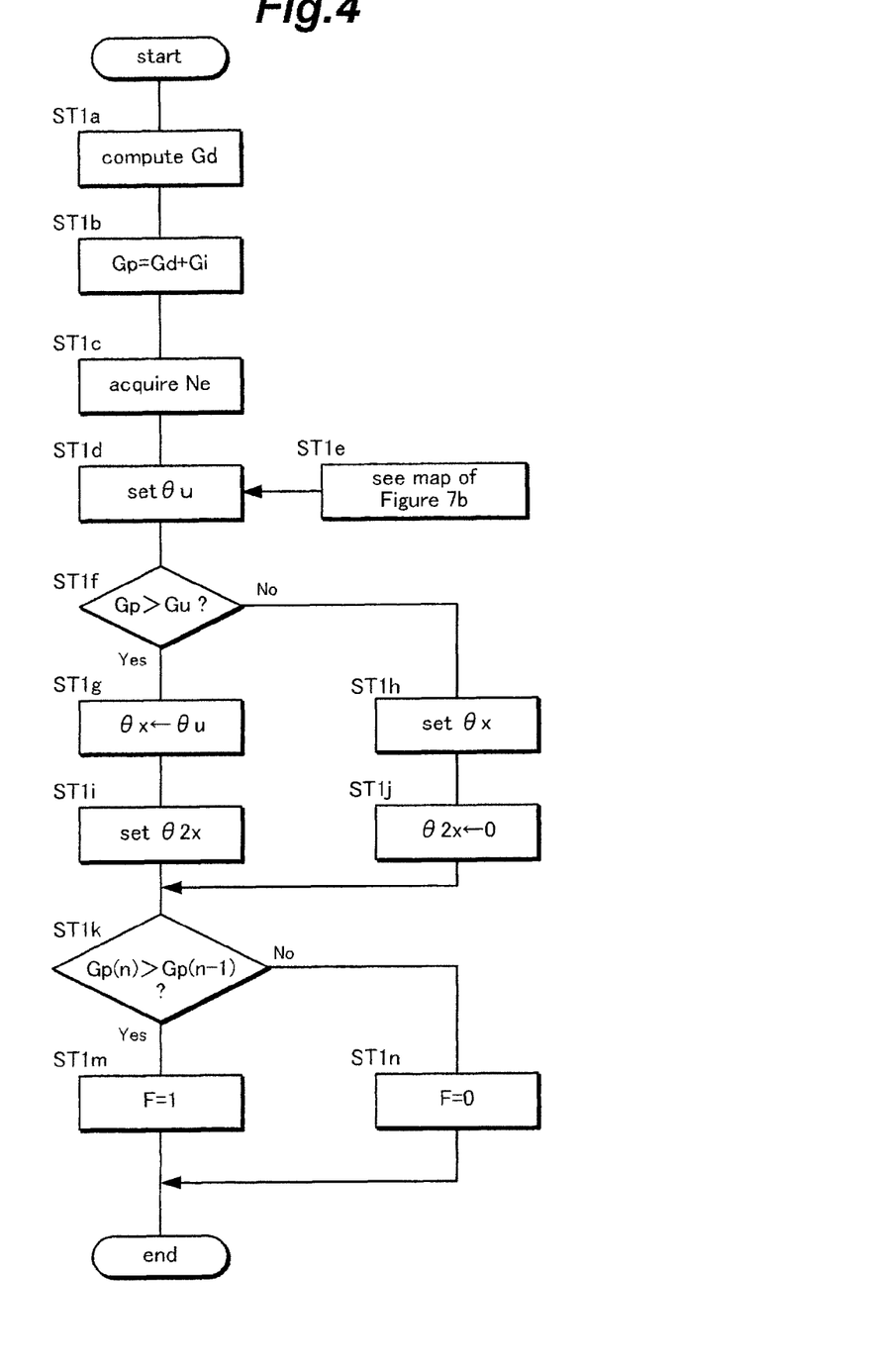
FIG. 4 is a flowchart showing the control flow of the throttle target opening angle determining process in the flowchart of FIG. 3.

Referring to FIG. 4, a demanded intake air flow rate Gd is computed according to the acceleration pedal signal ACL or according to the depression stroke of the accelerator pedal in step ST1a. The demanded intake air flow rate Gd may change linearly in relation with a change in the magnitude of the acceleration signal ACL. A target intake air flow rate Gp is then computed by adding an intake air flow rate Gi required for idling to the demanded intake air flow rate Gd in step ST1b. The demanded intake air flow rate Gd may be computed for each of the cylinders.

The first intake control valve opening angle correcting unit 101 of the ECU 100 acquires the rotational speed Ne of the engine which is detected by the engine rpm sensor in step ST1c. According to the acquired rotational speed Ne of the engine, the first intake control valve opening angle correcting unit 101 looks up a map (step ST1e) stored in the memory of the ECU 100, and determines the effective opening angle θu of the first intake control valve 6 for the given rotational speed Ne of the engine (step ST1d).

Figure 5:
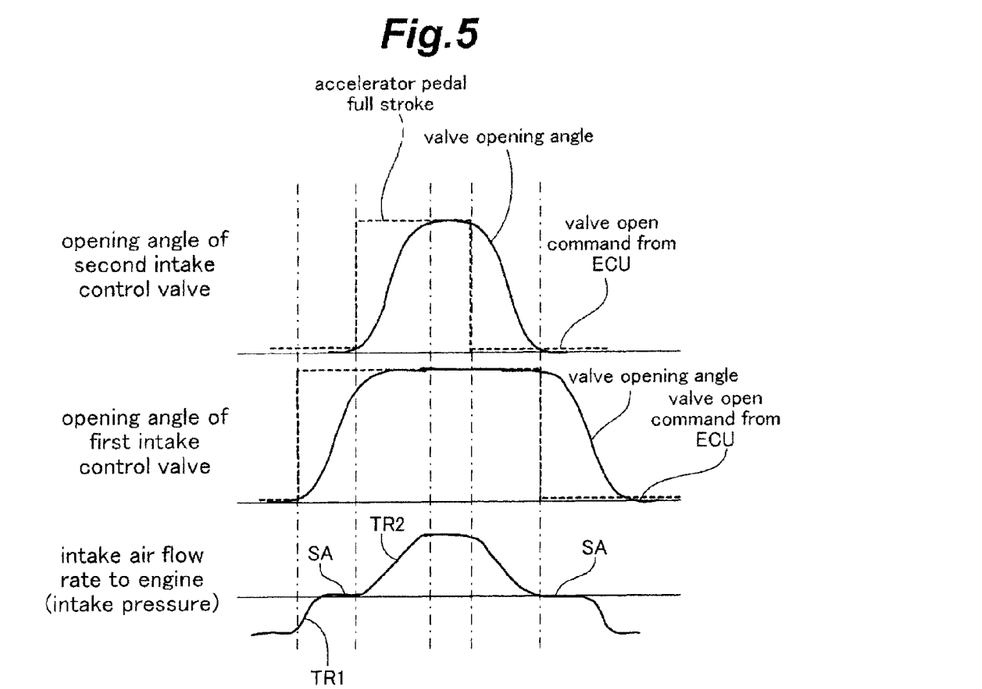
FIG. 5 is a time chart showing the relationship between the opening angle of the first intake control valve, the opening angle of the second intake control valve and an intake air flow rate (intake pressure) to the engine in a conventional intake system.
Figure 6:
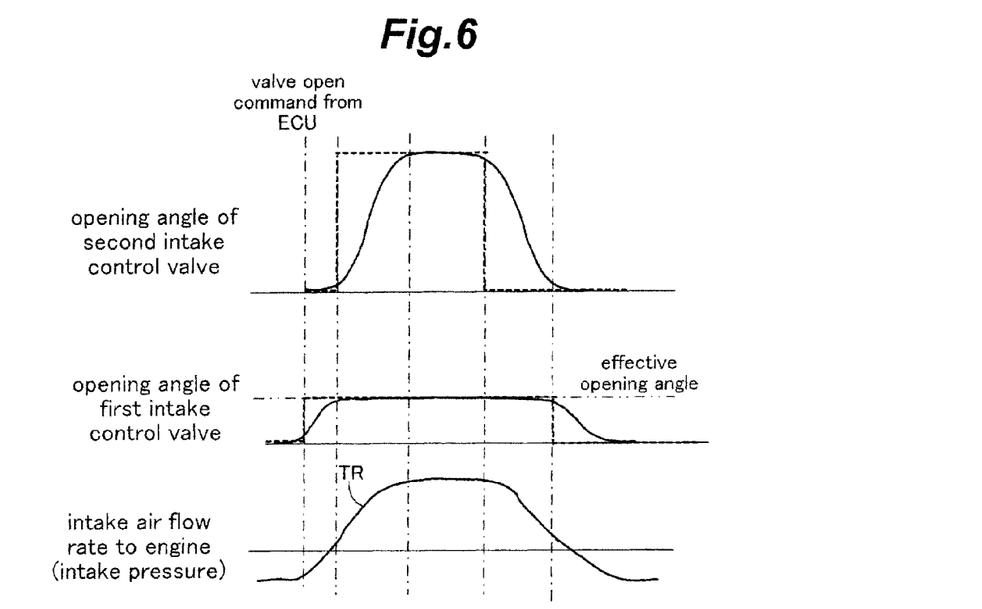
FIG. 6 is a time chart showing the relationship between the opening angle of the first intake control valve, the opening angle of the second intake control valve and an intake air flow rate (intake pressure) to the engine of the first embodiment.
Figure 7A:
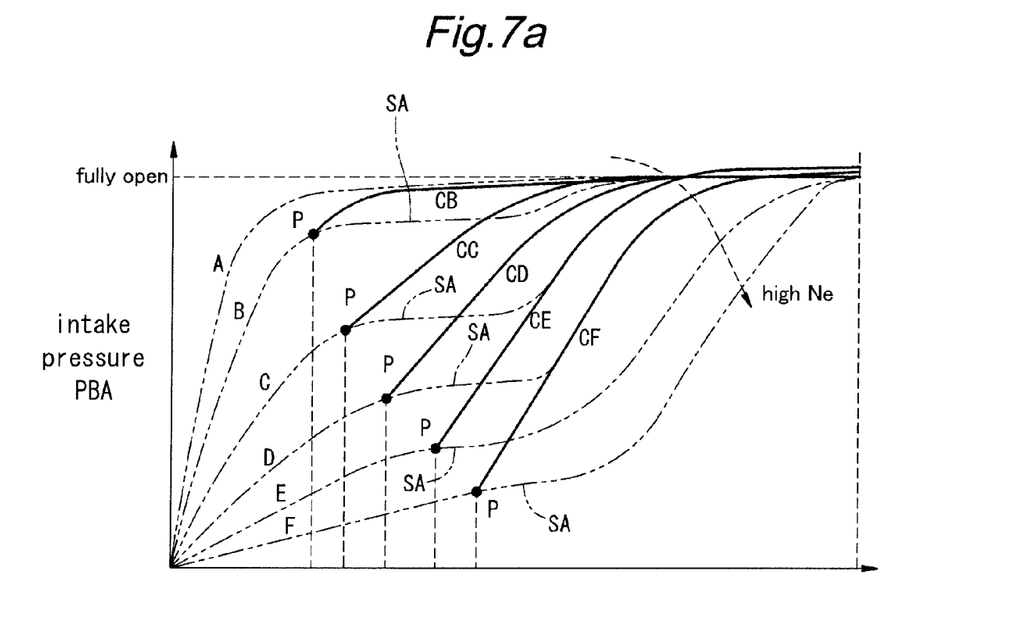
FIG. 7a is a diagram illustrating a map for determining an effective opening angle in the first embodiment.
Figure 7B:
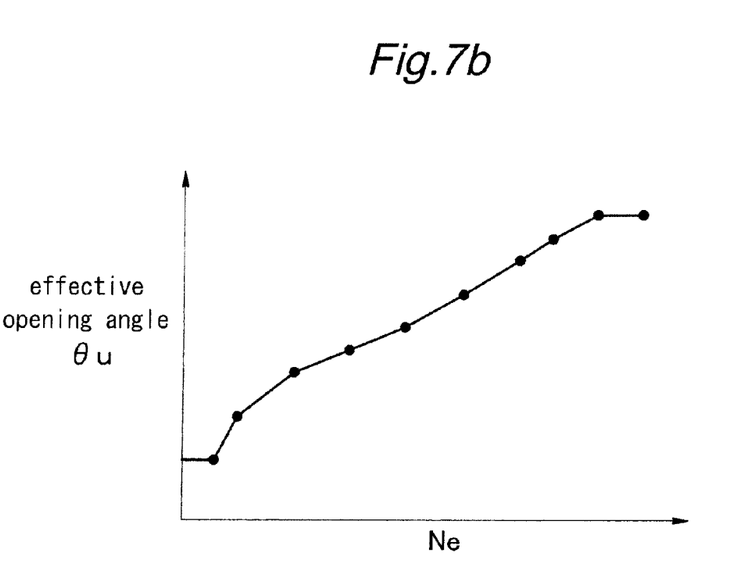
FIG. 7b is a graph illustrating the relationship between the rotational speed of the engine and the effective opening angle.

The relationship between the rotational speed Ne of the engine and effective opening angle θu stored in the memory of the ECU 100 as a map is described in the following with reference to FIGS. 5 to 7. FIG. 5 is a time chart showing the relationship between the opening angle of the first intake control valve, the opening angle of the second intake control valve and an intake air flow rate (intake pressure) to the engine in a conventional intake system, and FIG. 6 is a time chart showing the relationship between the opening angle of the first intake control valve 6, the opening angle of the second intake control valve 7 and an intake air flow rate (intake pressure or output torque) to the engine of the illustrated embodiment. FIG. 7a is a diagram illustrating a map for determining an effective opening angle in the first embodiment, and FIG. 7b is a graph illustrating the relationship between the rotational speed of the engine and the effective opening angle;

FIG. 5 is a timing chart showing the timing of opening the first intake control valve and second intake control valve in a multi-throttle engine such as the one disclosed in patent document 1 in a high rotational speed range, and the change in the intake air flow rate (intake pressure) to the engine is superimposed on this timing chart.

As can be seen from FIG. 5, when the engine rotational speed is high, the intake pressure may exceed the critical pressure of the first intake control valve so that the saturated state of the intake air flow rate indicated by the region SA may be produced.

Thereafter, the opening movement of the first intake control valve is ceased, and as the second intake control valve is opened in a progressive manner, a sudden increase in the intake air flow rate occurs. As result, the intake air flow rate (intake pressure) increases in three stages, a first region TR1 where the intake air flow rate increases with the opening of the first intake control valve, a second region SA where the saturated state is produced prior to the opening of the second intake control valve, and a third region TR2 where the intake air flow rate increases sharply with the opening of the second intake control valve. The second region SA is perceived by the vehicle operator as a region where the engine torque does not respond to the depressing of the accelerator pedal, and the vehicle fails to accelerate as much as the vehicle operator expects. Therefore, the impression of the vehicle is impaired. This occurs not only when accelerating but also when decelerating as indicated by the right hand side of the time chart of FIG. 5.

FIG. 6 is a timing chart, similar to FIG. 5, showing the timing of opening the first intake control valve 6 and second intake control valve 7 in the illustrated embodiment in a high rotational speed range, and the change in the intake air flow rate (intake pressure) to the engine is superimposed on this timing chart.

Referring to FIG. 6, when the first intake control valve 6 is opened to the effective opening angle, slightly short of reaching the saturated state, the ECU 100 forwards a valve opening command to the second intake control valve 7. In this case, a saturated region such as the region SA of the prior art shown in FIG. 5 is not produced, and the intake air flow rate (intake pressure) continues to increase as the accelerator pedal is progressively depressed. Therefore, the intake air flow rate (intake pressure or output torque) does not fail to increase as the accelerator pedal is depressed in a progressive manner.

The effective opening angle is determined as such an opening angle at which the change in the intake air flow rate passing through the first intake passage for a given increase in the opening angle of the first intake control valve starts falling below a prescribed ratio, and the saturated state has not yet occurred. By determining the effective opening angle within a certain range of such a critical opening angle, the intake air flow rate is enabled to change substantially in proportion to the opening angle of the first intake control valve so that the changes in the intake air flow rate can be made smooth at all times or the intake air flow rate can be made free from abrupt changes or stagnations.

FIG. 7a is a diagram showing the changes in the intake pressure PBA in relation with time as the accelerator is depressed. In particular, the double-dot chain dot lines A, B, C, D, E and F indicate the changes in the intake pressure PBA owing to the progressive opening of the first intake control valve 6 at different rotational speeds Ne of the engine in an ascending order. For instance, the double-dot chain dot line A shows the changes in the intake pressure PBA when the rotational speed Ne is the lowest, and the double-dot chain dot line F shows the changes in the intake pressure PBA when the rotational speed Ne is the highest. The solid lines CB, CC, CD, CE and CF branching off from the double-dot chain dot lines B, C, D, E and F indicate the changes in the intake pressure including the contributions of the opening of the second intake control valve 7 which occurs upon the first intake control valve 6 reaching the effective opening angle. The parts of the double-dot chain dot lines A, B, C, D, E and F beyond the points at which the solid lines CB, CC, CD, CE and CF branch off indicate the changes in the intake pressure PBA if the opening angle of the first intake control valve 6 at which the second intake control valve starts opening were fixed as was the case with the prior art. In this case also, the intake pressure PBA may be considered equivalent to the intake air flow rate for each cylinder or the output torque.

Referring to FIG. 7a, in the case of the lowest rotational speed Ne indicated by the double-dot chain dot line A, the second intake control valve 7 is not required to be opened to achieve the required intake air flow rate, and the intake pressure PBA or the intake air flow rate continually increases as the first intake control valve 6 is progressively opened throughout the depression stroke of the accelerator pedal.

However, when the rotational speed Ne is higher as indicated by double-dot chain dot lines B, C, D, E and F, the opening of the first intake control valve may create the saturated region SA in which the intake pressure PBA remains unchanged even though the accelerator pedal is progressively depressed. In the illustrated embodiment, a transition point P immediately preceding the saturated region SA of the intake pressure PBA and the opening angle of the first intake control valve at this point are detected. This opening angle is defined as the effective opening angle, and the creation of the saturated region can be avoided by initiating the opening of the second intake control valve 7 at this point.

FIG. 7b shows the plots of the effective opening angle θu of the first intake control valve 6 in relation to the rotational speed Ne at the aforementioned transition point P. This chart can be stored in the memory of the ECU 100 as a map. The map given in FIG. 7b is based on the assumption that the atmospheric pressure is at the standard atmospheric pressure. However, the map given in FIG. 7b may also obtained by modifying the opening angle or the intake pressure (intake air flow rate) in FIG. 7a according to the actual atmospheric pressure.

Referring to FIG. 4 again, it is determined if the target intake air flow rate Gp is greater than the effective opening angle intake air flow rate Gu corresponding to the effective opening angle θu in step ST1f. If the target intake air flow rate Gp is greater than the effective opening angle intake air flow rate Gu (for each cylinder) or Gp>Gu, the program flow advances to step ST1g. Otherwise, the program flow advances to step ST1h.

Figure 8A:
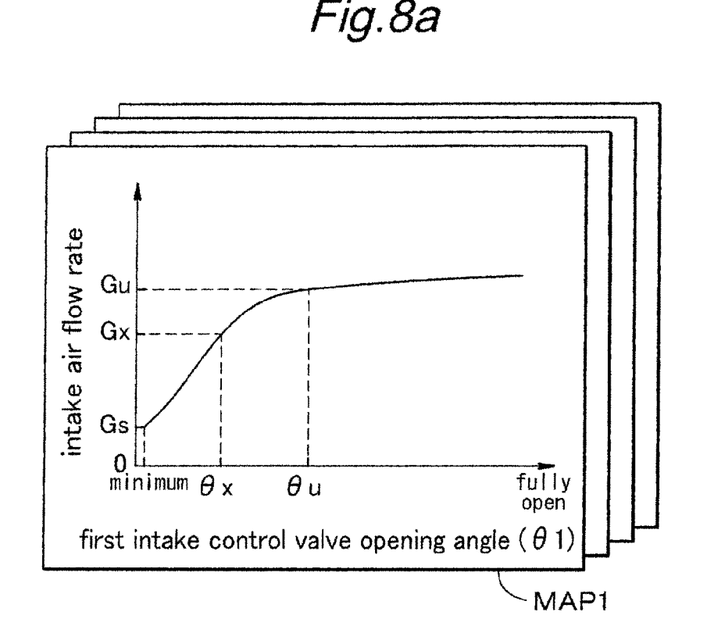
FIG. 8a is a graph illustrating a map determining the relationship between the opening angle of the first intake control valve and intake air flow rate.
Figure 8B:
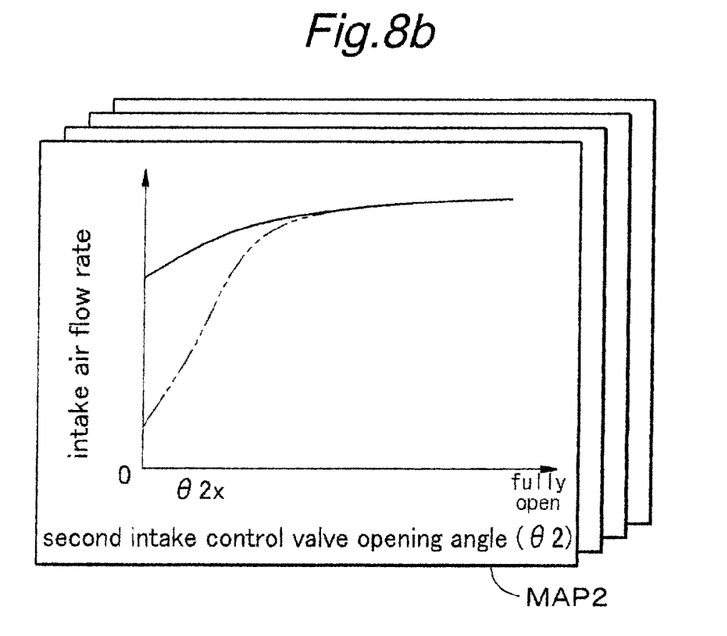
FIG. 8b is a graph illustrating a map determining the relationship between the opening angle of the second intake control valve and intake air flow rate.

The effective opening angle intake flow Gu based on the relationship between the opening angle of the first intake control valve 6 and intake air flow rate is described in the following with reference to FIGS. 8a and 8b. FIG. 8a represents the relationship between the opening angle and intake air flow rate of the first intake control valve 6, and FIG. 8b represents the relationship between the opening angle and intake air flow rate of the second intake control valve 7, at the standard atmospheric pressure in both cases. In each of these diagrams, the ordinate represents the intake air flow rate for each cylinder. FIG. 8 shows that the first intake air flow rate Gx is obtained when the opening angle is θx. The first intake control valve 6 opens before the second intake control valve 7, and is used primarily for controlling the intake air flow rate in idling and low speed operating conditions.

The first intake control vale 6 may be opened and closed over the whole opening angle range, from the fully closed state to the fully open state. However, the opening range actually used for the control may be limited to that between the minimally open angle for idling and the effective opening angle θu. The effective opening angle is defined as illustrated in FIG. 7b.

The minimum intake air flow rate Gs is obtained at the minimally open angle of the first intake control valve 6, and the effective opening angle intake air flow rate Gu is obtained at the effective opening angle θu. The first intake air flow rate Gx is obtained for each opening angle θx over the whole opening angle range or from the minimally open angle to the effective opening angle θu. As this relationship changes with the rotational speed Ne of the engine, a plurality of maps MAP1 are prepared for different ranges of the engine rotational speed. The maps MAP1 are based on the assumption that the second intake control valve 7 is fully closed. Any desired number of maps may be used, and it is also possible to interpolate the values across the different maps.

The intake air flow rate for each given opening angle of the second intake control valve 7 is given by the maps MAP2 represented in FIG. 8b. For the maps MAP2 as well, any desired number of maps may be used, and it is also possible to interpolate the values across the different maps. The abscissa of the graph of FIG. 8b represents the opening angle of the second intake control valve 7, and the ordinate thereof represents the intake air flow rate. In this graph, the intake air flow rate for a each given opening angle of the second intake control valve 7 when the first intake control valve 6 is at the effective opening angle θu is indicated by the solid line, and the intake air flow rate for a each given opening angle of the second intake control valve 7 when the first intake control valve 6 is at the minimal opening angle is indicated by the double-dot chain-dot line. The point indicated by θ2x on the abscissa indicates a target opening angle of the second intake control valve 7 which will be described hereinafter.

When Gp>Gu in step ST1f, the target opening angle θx of the first intake control valve 6 is set at the effective opening angle θu in step ST1g, and the target opening angle θ2x of the second intake control valve 7 is set from of the maps MAP2 selected in dependence on the actual rotational speed Ne of the engine in step ST1$i$. When Gu≧Gp in step ST1$f$, the opening angle θx of the first intake control valve 6 is set according to the target intake air flow rate Gp obtained from the map MAP1 in step ST1$h$, and the target opening angle θ2$x$ of the second intake control valve 7 is set to zero in step ST1$j$. The maps MAP1 and MAP2 are based on the assumption that the atmospheric pressure is at the standard atmospheric pressure, but may also be adjusted depending on the deviation of the actual atmospheric pressure from the standard atmospheric pressure.

In either case, the program flow advances to step ST1$k$. It is determined in step ST1$k$ if the current value Gp(n) of the target intake air flow rate Gp is greater than the previous value Gp(n−1). If the current value Gp(n) of the target intake air flow rate Gp is greater than the previous value Gp(n−1), the program flow advances to step ST1$m$. Otherwise, the program flow advances to step ST1$n$. In step ST1$m$, a throttle increase flag F is set to "1". In step ST1$n$, the throttle increase flag F is set to "0". In either case, the program flow of the flow chart shown in FIG. 4 is concluded.

Referring to FIG. 3 again, in step ST2, it is determined if the throttle increase flag F is "1". The throttle increase flag F is set to "1" when the target opening angle set in step ST1 is greater than that in the previous control cycle. If the throttle increase flag F is "1" in step ST2, the program flow advances to step ST3.

It is determined if the target opening angle θ2$x$ of the second intake control valve 7 is greater than zero (fully closed) in step ST3. If it is determined that the accelerator pedal depression corresponding to the idling or low speed operation of the engine is detected in step ST1, the engine is operated within the effective opening angle θu of the first intake control valve 6, and the opening angle of the second intake control valve 7 is zero. When the target opening angle θ2$x$ of the second intake control valve 7 is determined to be greater than zero in step ST3, the program flow advances to step ST4.

It is determined if the actual opening angle (detected opening angle) θ1 of the first intake control valve 6 has reached the effective opening angle θu in step ST4. If it is the case, the program flow advances to step ST5. If the actual opening angle (detected opening angle) θ1 of the first intake control valve 6 has reached the effective opening angle θu, and the intake air flow rate is to be increased further, it is necessary to open the second intake control valve 7. Accordingly, the second intake control valve 7 is opened to the target opening angle θ2$x$, and this control routine is concluded. In this connection, in view of the possible errors in detecting the actual opening angle of the first intake control valve 6, the determination step ST4 may consist of determining if the opening angle has reached a threshold opening angle which is slightly smaller than the effective opening angle, instead of the effective opening angle itself.

If the target opening angle of the second intake control valve 7 is determined to be zero in step ST3, the program flow advances to step ST6. It means that the target opening angle is not large enough for the second intake control valve 7 to be opened. Therefore, the first intake control valve 6 is opened to the target opening angle θx in step ST6, and the control routine is concluded.

If the throttle opening increase flag F is determined to be "0" in step ST2, the program flow advances to step ST8. It means that the intake air flow rate is to be decreased, and it is determined in step ST8 if the actual opening angle (detected opening angle) θ2 of the second intake control valve 7 is greater than zero. If it is determined in step ST8 that the actual opening angle (detected opening angle) θ2 of the second intake control valve 7 is zero, as it means that only the opening angle of the first intake control valve 6 us required to be controlled while the second intake control valve 7 is kept closed, the first intake control valve 6 is opened to the target opening angle θx in step ST9 before the control routine is concluded.

If it is determined in step ST8 that the actual opening angle θ2 of the second intake control valve 7 is greater than zero, the program flow advances to step ST10. In this case, the second intake control valve 7 is required to be closed before the first intake control valve 6. Accordingly, the second intake control valve 7 is actuated to the target opening angle θ2$x$ in step ST10, and the first intake control valve 6 is actuated to the effective opening angle θu in step ST11, before the control routine is concluded.

In this connection, in view of the possible errors in detecting the actual opening angle θ2 of the second intake control valve 7, the determination step ST8 may consist of determining if the opening angle is greater than a certain small angle slightly greater than zero, instead of zero angle. In this case also, if the opening angle of the second intake control valve 7 is less than this small angle, the program flow advances to step ST9. Otherwise, the program flow advances to step ST10.

The subsequent control cycle starts from step ST1 once again. For instance, when the program flow has advanced to step ST7, the first intake control valve 6 is opened to the effective opening angle θu. In such a case, the second intake control valve 7 is required to be opened to the target opening angle θ2$x$, and the opening action of the second intake control valve 7 occurs in step ST5 of the next control cycle. Likewise, if the program flow has advanced to step ST10, and the target opening angle is such that the second intake control valve 7 is to be fully closed, the second intake control valve 7 is first fully closed, and the first intake control valve 6 is closed by a required angle in step ST9 of the following control cycle.

In the illustrated embodiment, when the two intake control valves are to be actuated one after the other, the required control process is executed in step ST2 and those following step ST2. These valve opening and closing actions may be executed by suitable electronic circuits or computer programs of the ECU. By this control process, the first intake control valve 6 and second intake control valve 7 are appropriately controlled according to the state of the second intake control valve 7 so that the creation of a saturated region SA in which the intake pressure (intake air flow rate) saturates can be avoided.

Second Embodiment

Figure 9:
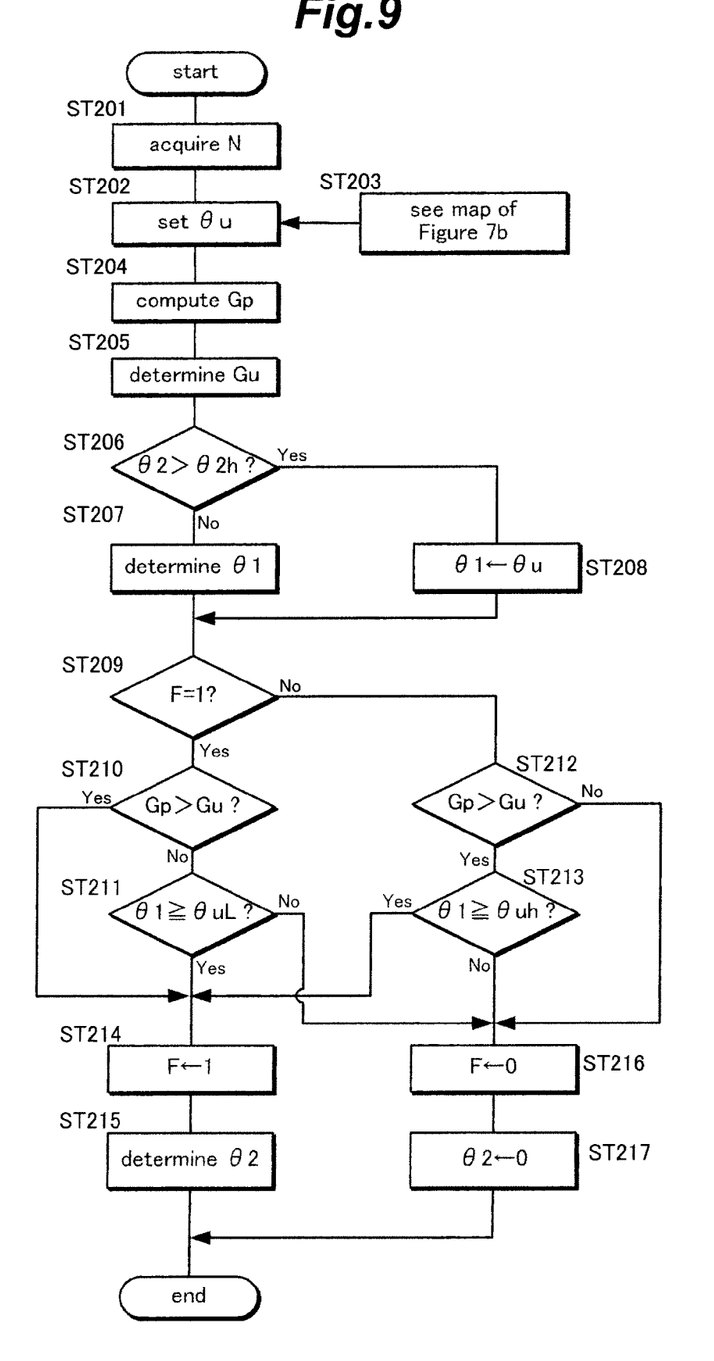
FIG. 9 is a flowchart showing a control flow of the control process for the first intake control valve and the second intake control valve of a second embodiment.
Figure 10:
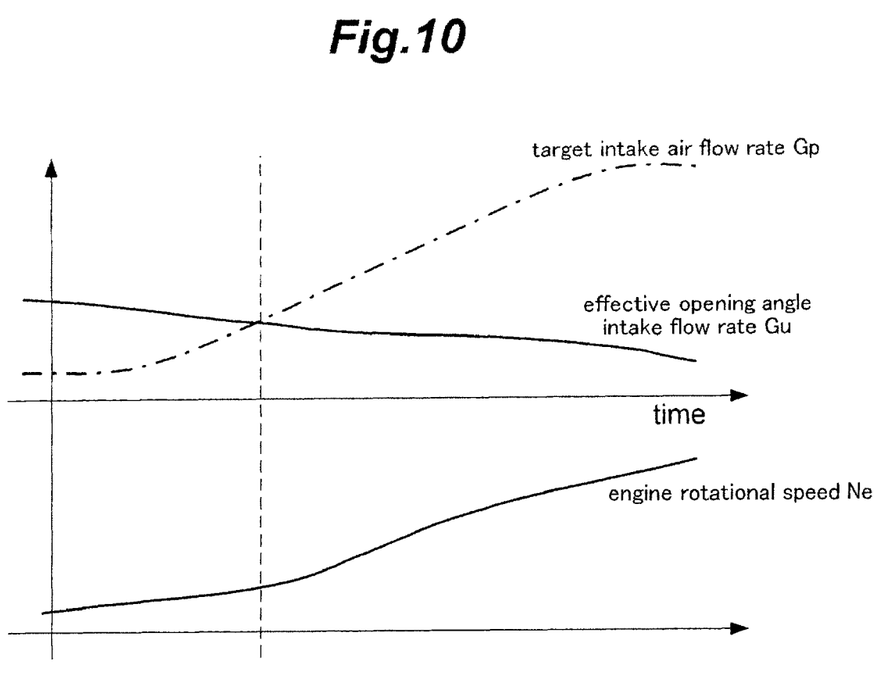
FIG. 10 is a time chart showing the relationship between an air flow rate corresponding to the effective opening angle of the first intake control valve and the target intake air flow rate as the rotational speed of the engine is increased.
Figure 11:
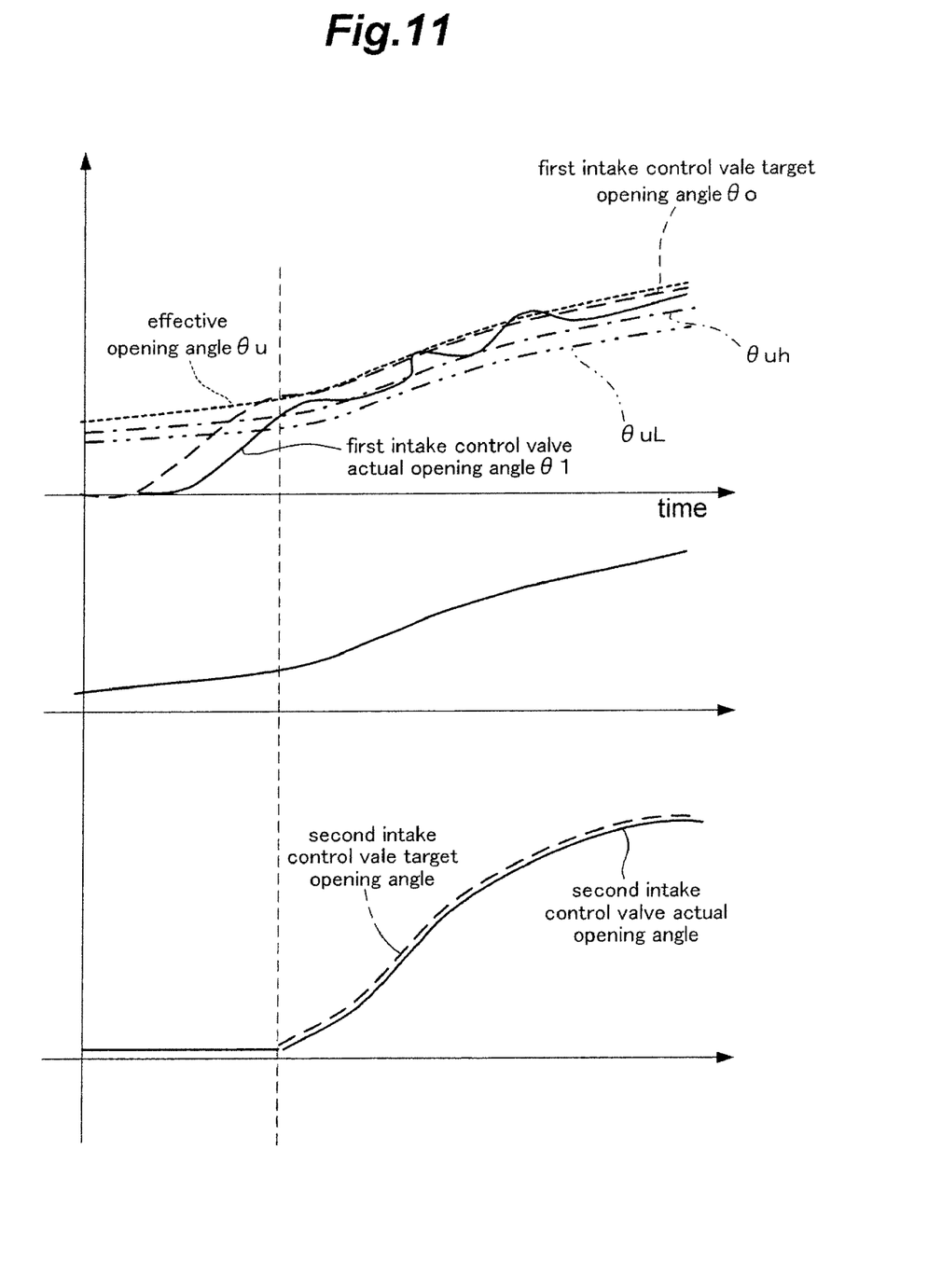
FIG. 11 is a time chart showing the relationship between the effective opening angle of the first intake control valve and the actual opening angle as the rotational speed of the engine is increased.

A second embodiment of the present invention is now described in the following with reference to FIGS. 9 to 11. This embodiment is not different from the first embodiment in the functional elements illustrated in FIGS. 1 and 2, but differs from the first embodiment in the control process executed by the ECU 100. FIG. 9 is a flowchart showing the control process for the first intake control valve 6 and second intake control valve 7. FIG. 10 is a time chart showing the changes in the intake air flow rate corresponding to the effective opening angle of the first intake control valve in relation with the changes in the target intake air flow rate as the rotational speed of the engine is increased. FIG. 11 is a time chart showing the actual opening angle of the first intake control valve in relation to the effective opening angle thereof as the rotational speed of the engine is increased.

Referring to FIG. 9, the first intake control valve opening angle correcting unit 101 of the ECU 100 receives the rpm signal Ne from the engine rotational speed sensor in step ST201. The first intake control valve opening angle correcting unit 101 then computes an effective opening angle Au corresponding to the detected rpm signal (step ST202) by looking up a map stored in the memory of the ECU 100 (step ST203). The map looked up in step ST203 may consist of a chart obtained by plotting the effective opening angle θu for different rotational speeds Ne at the transition point P as shown in FIG. 7b, similarly as in the first embodiment.

A demanded intake air flow rate Gd is computed according to the acceleration signal ACL or according to the depression stroke of the accelerator pedal in step ST204. The demanded intake air flow rate Gd may change linearly in relation with a change in the magnitude of the acceleration pedal signal ACL. A target intake air flow rate Gp is then computed by adding an intake air flow rate Gi required for idling to the demanded intake air flow rate Gd in step ST204.

The effective opening angle intake air flow rate Gu is then determined in step ST205 by looking up a map representing the relationship between the rotational speed Ne of the engine and effective opening angle intake air flow rate Gu. As shown in FIG. 10, when the first intake control valve 6 is at the effective opening angle θu, the flow rate of the air that passes through the first intake control valve 6 changes with the rotational speed Ne of the engine. This air flow rate is the effective opening angle intake air flow rate Gu, and the time chart shown in FIG. 10 may be used as a map for looking up the effective opening angle intake air flow rate Gu for each given effective opening angle θu. As shown in the time chart of FIG. 10, upon the effective opening angle intake air flow rate Gu exceeding the target intake air flow rate Gp at the boundary indicated by the dotted line, the control process of opening the second intake control valve 7 is started.

The opening angle θ2 of the second intake control valve 7 is compared with θ2h in step ST206. θ2h is threshold opening angle which is a small angle close to zero. If θ2 is smaller than θ2h (step ST206: No), as it means that the second intake control valve 7 is essentially fully closed, the opening angle θ1 of the first intake control valve 6 is determined by looking up a map representing the relationship between the target intake air flow rate Gp and rotational speed Ne of the engine (step ST207). This map may be similar to that shown in FIG. 8, and plots the opening angle θ1 for different values of the target intake air flow rate Gp. As this relation depends on the rotational speed Ne of the engine, a plurality of such maps corresponding to different rotational speeds Ne of the engine may be prepared. Any desired number of such maps may be used, and the relationship may be interpolated across the different maps. If θ2 is greater than θ2h (step ST206: Yes), as it means that the second intake control valve 7 is open to a certain extent, the opening angle θ1 of the first intake control valve 6 is set at the effective opening angle θu (step ST208).

In either case, it is determined in step ST209 if the flag F is "1". The flag F is initially given with "0", and is set to "0" or "1" in the subsequent control process. The flag F is set to "1" when the opening angle θ1 of the first intake control valve 6 is greater than the effective opening angle θu in the region where the target intake air flow rate Gp is greater than the effective opening angle intake air flow rate Gu or the region to the right of the broken line in FIG. 10.

The valve opening control of the first intake control valve 6 of the illustrated embodiment is described in the following with reference to FIG. 11. FIG. 11 shows the changes in the actual opening angle θ1 of the first intake control valve 6 in relation to the first intake control valve target opening angle θ0 which is set for the given effective opening angle θu as the rotational speed Ne of the engine is increased. As shown in FIG. 11, based on the effective opening angle θu indicated by the dotted line, the first intake control valve 6 is controlled so as to achieve the first intake control valve target opening angle θ0 indicated by the broken line. The opening angle θ1 of the first intake control valve 6 follows the first intake control valve target opening angle θ0 as indicated by the solid line. The vertical broken line in FIG. 11 corresponds to that of FIG. 10, and indicates the boundary at which the effective opening angle intake air flow rate Gu falls below the target intake air flow rate Gp, and the valve opening control of the second intake control valve 7 is required to be initiated.

In the second embodiment, a first threshold opening angle θuh and a second second threshold opening angle θuL, in addition to the effective opening angle θu, are defined. A steady-state offset error may exist between the target opening angle (such as the first intake control valve target opening angle θ0) and the detected actual opening angle (such as the first intake control valve actual opening angle θ1) owing to the detection error in the opening angle sensor of the first intake control valve or the property of the particular controller that is used. The threshold opening angles are defined so as to account for such a steady-state offset error. The first threshold opening angle θuh is slightly smaller than the effective opening angle θu (θuh<θu). (It is also possible to use the effective opening angle θu, instead of the first threshold opening angle θuh, depending on the particular need without departing from the spirit of the present invention.) The detected actual opening angle typically follows the target opening angle with some time delay. To avoid a hunting of the opening angle of the second intake control valve 7 due to such a time delay, the second threshold opening angle θuL is selected as a value slightly greater than the effective opening angle θu (θuL>θu). (It is also possible to use the effective opening angle θu, instead of the second threshold opening angle θuL, if the response delay of the system is small enough, without departing from the spirit of the present invention.)

Referring to FIG. 9 once again, if the flag F is determined to be "1" in step ST209 (step ST209: Yes), a comparison is made between the effective opening angle intake air flow rate Gu and target intake air flow rate Gp in step ST210. If the target intake air flow rate Gp is greater than the effective opening angle intake air flow rate Gu (step ST210: Yes), the flag F is set to "1" in step ST214. This causes the boundary indicated by the dotted line shown in FIG. 10 to be crossed, and the target intake air flow rate Gp to exceed the air flow rate enabled solely by the first intake control valve 6 opened to the effective opening angle. As a result, the flag F is set to "1", and the valve opening control of the second intake control valve 7 is initiated in step ST215. In this valve opening control, the opening angle θ2 of the second intake control valve 7 is determined by looking up the map given the target intake air flow rate Gp in relation to the rotational speed Ne of the engine in step ST215 before the control routine is concluded. This map may be identical to that given in FIG. 8, and plots the opening angle θ2 of the second intake control valve 7 in relation to the target intake air flow rate Gp. As this relationship depends on the rotational speed Ne of the engine, a plurality of maps MAP2 are prepared so that the map to be used may be selected from them depending on the particular rotational speed Ne of the engine. It is also possible to interpolate across the maps.

If the target intake air flow rate Gp is smaller than the effective opening angle intake air flow rate Gu in step ST210 (step ST210: No), a comparison is made between the actual opening angle θ1 of the first intake control valve 6 and the second threshold opening angle θuL in step ST211. If the actual opening angle θ1 of the first intake control valve 6 is equal to or greater than the second threshold opening angle θuL (step ST211: Yes), the flag F is set to "1" in step ST214. The opening angle θ2 of the second intake control valve 7 is then determined by looking up the map representing the relationship between the target intake air flow rate Gp and the rotational speed Ne of the engine as illustrated in FIG. 8b in step ST215 before the control process is concluded.

If the actual opening angle θ1 of the first intake control valve 6 is smaller than the second threshold opening angle θuL (step ST211: No), the flag F is set to "0" in step ST216. The opening angle θ2 of the second intake control valve 7 is set to zero in step ST217 before the control process is concluded.

If the flag F is "0" in step ST209 (step ST209: No), a comparison is made between the target intake air flow rate Gp and effective opening angle intake air flow rate Gu in step ST212. If the target intake air flow rate Gp is smaller than the effective opening angle intake air flow rate Gu in step ST212 (step ST212: No), the flag F is set to "0" in step ST216. The opening angle θ2 of the second intake control valve 7 is set to zero in step ST217 before the control process is concluded.

If the target intake air flow rate Gp is greater than the effective opening angle intake air flow rate Gu in step ST210 (step ST212: Yes), a comparison is made between the actual opening angle θ1 of the first intake control valve 6 and the first threshold opening angle θuh in step ST213. If the actual opening angle θ1 of the first intake control valve 6 is equal to or greater than the first threshold opening angle θuh (step ST213: Yes), the flag F is set to "1" in step ST214. The opening angle θ2 of the second intake control valve 7 is then determined by looking up the map representing the relationship between the target intake air flow rate Gp and the rotational speed Ne of the engine as illustrated in FIG. 8b in step ST215 before the control process is concluded.

If the actual opening angle θ1 of the first intake control valve 6 is smaller than the first threshold opening angle θuh in step ST213 (step ST213: No), the flag F is set to "0" in step ST216. The opening angle θ2 of the second intake control valve 7 is set to zero in step ST217 before the control process is concluded.

According to the control flow described above, similarly as in the first embodiment, the first intake control valve 6 and second intake control valve 7 are appropriately controlled according to the state of the second intake control valve 7 so that the creation of a saturated region SA in which the intake pressure (intake air flow rate) saturates can be avoided. This embodiment includes the steps of setting the flag F to "1" or to approve the opening of the second intake control valve 7 when the determination results of steps ST212 and ST213 are both Yes, and setting the flag F back to "0" or to cancel the approval of the opening of the second intake control valve 7 when the determination results of steps ST210 and ST211 are both No. Therefore, when the effective opening angle θu has increased to such an extent that the detected opening angle θ1 of the first intake control valve 6 has temporarily become smaller than the current effective opening angle θu owing to the increase in the rotational speed Ne of the engine after the flag F has been set to "1", the flag F is kept at "1" until the determination results of steps ST210 and ST211 have both changed to No. For instance, as long as the flag F is "1" and Gp>Gu, the detected opening angle θ1 of the first intake control valve 6 is not taken into account. Therefore, when the effective opening angle θu is increasing owing to an increase in the rotational speed Ne of the engine, the second intake control valve 7 is prevented from fully closing or dwelling at a certain opening angle, and a favorable response of the second intake control valve 7 when accelerating can be ensured.

The present invention was described in terms of specific embodiments, but the present invention is not limited by the illustrated embodiments, and can be changed in various parts thereof without departing from the spirit of the present invention. For instance, the control system may be configured such that the first and second intake control valves may be simultaneously opened and/or closed when a high response is desired such as when a sport mode for the engine is manually selected, when part of the cylinders are put out of operation and when a shifting of the transmission has taken placed.

The contents of the original Japanese patent application on which the Paris Convention priority claim is made for the present application, as well as the contents of any prior art references mentioned in the disclosure, are incorporated in this application by reference.

We claim:

1. An intake system for an internal combustion engine, comprising a first intake passage having an upstream end communicating with an intake duct and a downstream end communicating with an intake port of an engine cylinder, a first intake control valve provided in the first intake passage, a second intake passage having an upstream end communicating with the intake duct and a downstream end communicating with the intake port of the engine cylinder, a second intake control valve provided in the second intake passage and a control unit for controlling opening angles of the first and second intake control valves, wherein:

the control unit is configured to start opening the second intake control valve when the first intake control valve has opened to an effective opening angle which depends on a rotational speed of the engine and is defined in a region where a change in the intake air flow rate of the first intake passage for a given change in the opening angle of the first intake control valve falls below a prescribed level.

2. The intake system for an internal combustion engine according to claim 1, wherein the engine comprises a plurality of cylinders, and the first intake control valve is provided common to the cylinders while the second intake control valve is provided for each cylinder.

3. The intake system for an internal combustion engine according to claim 1, wherein the effective opening angle increases as the rotational speed of the engine increases.

4. The intake system for an internal combustion engine according to claim 1, wherein the first intake control valve is maintained at the effective opening angle during a time the second intake control valve is opened, the effective opening angle changing in dependence on the rotational speed of the engine.

5. The intake system for an internal combustion engine according to claim 1, wherein the first intake control valve starts to be closed from the effective opening angle when the second intake control valve has been fully closed from an open state.

6. An intake system for an internal combustion engine, comprising a first intake passage having an upstream end communicating with an intake duct and a downstream end communicating with an intake port of an engine cylinder, a first intake control valve provided in the first intake passage, a second intake passage having an upstream end communicating with the intake duct and a downstream end communicating with the intake port of the engine cylinder, a second intake control valve provided in the second intake passage and a control unit for controlling opening angles of the first and second intake control valves, wherein:

the control unit is configured to start opening the second intake control valve when the first intake control valve has opened to an effective opening angle which depends on a rotational speed of the engine, compute a target intake air flow rate, compute an effective opening angle of the first intake control valve according to the rotational speed of the engine, compute an effective intake air flow rate when the first intake control valve is at the effective opening angle and the second intake control valve is substantially fully closed, determine if the target intake air flow rate is greater than the effective intake air flow rate, determine if the opening angle of the first intake control valve is greater than a first threshold opening angle which may be equal to the effective intake air flow rate or slightly smaller than the same, issue a permission to allow the second intake control valve to be opened if the target intake air flow rate is greater than the effective intake air flow rate, and the opening angle of the first intake control valve is greater than the first threshold opening angle, and maintain the permission until the target intake air flow rate becomes smaller than the effective intake air flow rate, and the opening angle of the first intake control valve is smaller than a first threshold opening angle which is slightly smaller than the first threshold opening angle, and cancel the permission thereafter.

7. The intake system for an internal combustion engine according to claim 6, wherein the effective opening angle is defined in a region where a change in the intake air flow rate of the first intake passage for a given change in the opening angle of the first intake control valve falls below a prescribed level.

8. The intake system for an internal combustion engine according to claim 6, wherein the engine comprises a plurality of cylinders, and the first intake control valve is provided common to the cylinders while the second intake control valve is provided for each cylinder.

9. The intake system for an internal combustion engine according to claim 6, wherein the effective opening angle increases as the rotational speed of the engine increases.

10. The intake system for an internal combustion engine according to claim 6, wherein the first intake control valve is maintained at the effective opening angle during a time the second intake control valve is opened, the effective opening angle changing in dependence on the rotational speed of the engine.

11. The intake system for an internal combustion engine according to claim 6, wherein the first intake control valve starts to be closed from the effective opening angle when the second intake control valve has been fully closed from an open state.

12. A control method for an intake system of an internal combustion engine, the intake system comprising a first intake passage having an upstream end communicating with an intake duct and a downstream end communicating with an intake port of an engine cylinder, a first intake control valve provided in the first intake passage, a second intake passage having an upstream end communicating with the intake duct and a downstream end communicating with the intake port of the engine cylinder, a second intake control valve provided in the second intake passage, an accelerator pedal and a control unit for controlling opening angles of the first and second intake control valves, the method comprising:

opening the first intake control valve in dependence on a depression stroke of the accelerator pedal; and opening the second intake control valve when the first intake control valve has opened to an effective opening angle which depends on a rotational speed of the engine and is defined in a region where a change in the intake air flow rate of the first intake passage for a given change in the opening angle of the first intake control valve falls below a prescribed level.

13. A control method for an intake system of an internal combustion engine, the intake system comprising a first intake passage having an upstream end communicating with an intake duct and a downstream end communicating with an intake port of an engine cylinder, a first intake control valve provided in the first intake passage, a second intake passage having an upstream end communicating with the intake duct and a downstream end communicating with the intake port of the engine cylinder, a second intake control valve provided in the second intake passage, an accelerator pedal and a control unit for controlling opening angles of the first and second intake control valves, the method comprising:

opening the first intake control valve in dependence on a depression stroke of the accelerator pedal, opening the second intake control valve when the first intake control valve has opened to an effective opening angle which depends on a rotational speed of the engine, computing a target intake air flow rate, computing an effective opening angle of the first intake control valve according to the rotational speed of the engine, computing an effective intake air flow rate when the first intake control valve is at the effective opening angle and the second intake control valve is substantially fully closed, determining if the target intake air flow rate is greater than the effective intake air flow rate, determining if the opening angle of the first intake control valve is greater than a first threshold opening angle which may be equal to the effective intake air flow rate or slightly smaller than the same, issuing a permission to allow the second intake control valve to be opened if the target intake air flow rate is greater than the effective intake air flow rate, and the opening angle of the first intake control valve is greater than the first threshold opening angle, and maintaining the permission until the target intake air flow rate becomes smaller than the effective intake air flow rate, and the opening angle of the first intake control valve is smaller than a first threshold opening angle which is slightly smaller than the first threshold opening angle, and canceling the permission thereafter.

14. The control method according to claim 12, wherein the effective opening angle is defined in a region where a change in the intake air flow rate of the first intake passage for a given change in the opening angle of the first intake control valve falls below a prescribed level.

* * * * *